United States Patent

Baz et al.

Patent Number: 5,089,281
Date of Patent: Feb. 18, 1992

[54] PREPARATION OF QUICK COOKING RICE

[75] Inventors: Afif A. Baz, Waterbury; Jau Y. Hsu, Brookfield; Eugene Scoville, New Milford, all of Conn.

[73] Assignee: Nestec S.A., Vevey, Switzerland

[21] Appl. No.: 622,387

[22] Filed: Nov. 30, 1990

Related U.S. Application Data

[63] Continuation of Ser. No. 303,533, Jan. 27, 1989, abandoned.

[51] Int. Cl.$^5$ ................................................ A23B 4/03
[52] U.S. Cl. .................................... 426/461; 426/460
[58] Field of Search .............. 426/456, 451, 460, 461, 426/465

[56] References Cited

U.S. PATENT DOCUMENTS

| | | | |
|---|---|---|---|
| 2,696,156 | 12/1954 | Campbell et al. | 426/450 |
| 2,720,460 | 10/1955 | Flynn et al. | 426/461 |
| 3,083,102 | 3/1963 | Carcassonne-Leduc | 426/461 |
| 3,086,867 | 4/1963 | Miller | 426/450 |
| 3,157,514 | 11/1964 | Gorozpe | 426/461 |
| 3,291,615 | 12/1966 | Thompson et al. | 426/461 |
| 4,334,366 | 6/1982 | Lockwood | 426/465 |
| 4,338,344 | 7/1982 | Brooks et al. | 426/461 |
| 4,361,593 | 11/1982 | Brooks et al. | 426/461 |

Primary Examiner—Donald E. Czaja
Assistant Examiner—Helen Pratt
Attorney, Agent, or Firm—Vogt & O'Donnell

[57] ABSTRACT

A quick-cooking rice product is prepared by first cooking rice at substantially atmospheric pressure in an amount of water at least sufficient to hydrate the rice to a moisture content of from about 60% to 75% by weight and at a temperature of about 90° C. to 100° C. for from about 1 min to 10 mins for hydrating the rice to a moisture content of from about 30% to 60% by weight. The water cooked rice then is steam pressure cooked in water with agitation at a pressure of from about 250 mm Hg to about 2500 mm Hg above atmospheric pressure for from about 1 min to 50 mins for further hydrating and gelatinizing the rice for obtaining a cooked rice which has a moisture content of from about 60% to 75% by weight and which is about 85% to 100% gelatinized. After steam pressure cooking, the pressure is gradually released for avoiding puffing the cooked rice. The cooked rice then is dried at a temperature from about 140° C. to 205° C.

14 Claims, No Drawings

PREPARATION OF QUICK COOKING RICE

CROSS-REFERENCE TO RELATED APPLICATION

This is a File Wrapper Continuing application of application Ser. No. 07/303,533, filed Jan. 27, 1989.

BACKGROUND OF THE INVENTION

The present invention relates to the preparation of a dehydrated pre-cooked rice product which may be rapidly rehydrated and cooked for consumption.

Dehydrated rice products have been prepared conventionally by soaking raw rice followed by water cooking, or by steaming the soaked rice, or by a combination of water cooking and steaming for cooking the rice and then subsequently drying the cooked rice. A problem which has been persistent in the art to prepare a dehydrated pre-cooked rice product which can be prepared in a short period of time for consumption is the ability to hydrate and gelatinize the rice uniformly so that the dehydrated pre-cooked rice, upon cooking and reconstitution for serving, has a uniform consistency of texture. In addition, water cooking requires significant amounts of energy input because of the amount of water utilized which, generally, is on the order of a ratio of water to rice by weight of at least about 5:1 and usually on the order of about 10:1.

When soaked or water-cooked rice subsequently is steam cooked, conventionally, the rice is steam cooked at substantially atmospheric pressure. However, British Patent Specification 563,792, which proposes steeping rice in water and then steaming it at atmospheric pressure, mentions that prior unidentified processes for the treatment of rice had been proposed wherein rice was steeped in water and subsequently steamed at a pressure above atmospheric pressure to gelatinize it.

U.S. Pat. No. 3,086,867 discloses a process for preparing a quick cooking dehydrated brown rice product which is said to be gelatinized uniformly wherein raw brown rice is hydrated in water at a temperature of from about 75° C. to 100° C. to increase the moisture content of the rice to from 20% to 50% to split the bran coat partially. The hydrated rice then alternately is steamed at a temperature of 100° C. or greater, which is for gelatinizing the rice, and sprayed with water, which is for increasing the moisture content of the rice about 3% to 5% during each addition of water, until the rice is completely gelatinized and has a moisture content above 65%. The cooked rice then is dried in a manner in which moisture is removed from the surface of the rice faster than water can diffuse from the interior of the rice to the surface of the rice grain so the rice will be puffed and porous.

U.S. Pat. No. 4,338,344 discloses a method for preparing a quick-rehydrating, fully gelatinized rice in which raw rice is introduced into and advanced through a water bath contained inside an inclined, enclosed chamber that the water will cover from about between 40% and 90% of the length of travel of the rice through the chamber. The water is maintained at a temperature of from about 80° C. to 110° C. The rice is conveyed with agitation from the bottom of the water bath to the surface of the water under atmospheric conditions at a temperature up to 100° C. within a time range of from 10 to 50 minutes. When the rice exits the surface of the water bath, the partially cooked rice enters a steam atmosphere, which is disclosed to be preferably under pressure. For superatmospheric operation, the temperature of the water bath is from about 100° C. to 110° C. and the cooking time of the rice in the water bath is from about 2 to 30 minutes. When the partially cooked rice is steamed under pressure, pressures on the order of from 150 mm Hg to 260 mm Hg above atmospheric pressure are said to be preferred. The rice leaving the water bath is conveyed with agitation through the steam atmosphere for from 1 min to 30 mins after which it is removed from the chamber and dried.

SUMMARY OF THE INVENTION

We have discovered a combination of first cooking rice in water under atmospheric pressure and then steam cooking the rice at superatmospheric pressure in water which easily is operated sequentially and controlled independently in the same vessel thereby efficiently enabling obtaining a rice product which is hydrated uniformly to a moisture content of from about 60% to 75% and which is gelatinized uniformly. The process further enables utilization of minimal amounts of water for cooking which results in significant savings of energy.

Accordingly, the present invention is characterized by first cooking rice at substantially atmospheric pressure in an amount of water at least sufficient to hydrate the rice to a moisture content of from about 60% to 75% by weight and at a temperature of from about 90° C. to 100° C. for from about 1 min to 10 mins for hydrating the rice to a moisture content of from about 30% to 60% by weight and then steam pressure cooking the watercooked rice in water, most advantageously, together with the remaining cooking water, at a pressure of from about 250 mm Hg to 2500 mm Hg above atmospheric pressure for from about 1 min to 50 mins while agitating the rice and water for obtaining a cooked rice which has a moisture content of from about 60% to 75% by weight and which is from 85% to 100% gelatinized. After these cooking steps, the process further includes gradually releasing the pressure from the cooked rice to atmospheric pressure for avoiding substantially puffing the cooked rice and then drying the cooked rice at a temperature of from about 140° C. to 205° C. to a stable moisture content, preferably on the order of from 3% to 12% by weight.

For precise control of bulk density, and to obtain an advantageous bulk density of from about 35 g/100 ml to about 40 g/100 ml which enables the rice to have optimal texture and to be reconstituted rapidly for consumption, the drying is carried out in two steps, the first being drying the cooked rice under stationary conditions and the second being drying the predried rice under agitated conditions.

DETAILED DESCRIPTION OF THE INVENTION AND DESCRIPTION OF PREFERRED EMBODIMENTS

In practicing the process of the present invention, any type of rice grain can be utilized, for example, raw rice milled white rice, brown rice, wild rice, arborio rice, basmati rice and Spanish rice, but the process of this invention is particularly advantageous for parboiled rice.

Although it is not intended that the invention be so limited, cooking preferably is conducted batchwise. Although a closed vessel is not required during the water cooking step, such is preferred to eliminate unnecessary loss of water. Therefore, during the water cooking step, utilization of a closed vessel having venting means such that a pressure which is at substantially atmospheric pressure is obtained is preferred. The apparatus in which the steam cooking step is carried out is a pressure vessel capable of withstanding the internal pressures involved in the steam pressure cooking step. Various means may be utilized for agitating the rice during steam pressure cooking, but preferably, the vessel is equipped for engaging the rice in a tumbling action. Although not required, agitation also may be utilized during water cooking.

The water cooking step at substantially atmospheric pressure is for partially hydrating the rice grains which thereby provides uniform moisture distribution in the grains and enables homogeneous gelatinization to occur upon steam pressure cooking in the presence of water, thereby providing a uniform good quality product texture. Insufficient hydration during water cooking, that is, hydrating to a moisture content of below about 30% by weight, results in uneven gelatinization in the finally cooked rice grains even when steam cooked in accordance with the present invention, and the finished product texture is therefore not uniform. Preferably, the rice is cooked in the water cooking step for a time sufficient to hydrate it to a moisture content of from about 40% to 45% by weight.

The amount of water present during water cooking is in a ratio of water to rice of at least about 1.5:1 by weight and may be in an amount of water to rice in a ratio of from about 1.5:1 to 5:1, and preferably from 2:1 to 3:1. Although a water to rice ratio greater than 5:1 may be utilized, such is less efficient both in terms of water usage and energy requirements and will detract from economic benefits which can be realized from practice of the present invention, which include the attribute that the vessel may be more rapidly and uniformly pressurized for the steam cooking step.

The rice is water cooked at a temperature of about 90° C. to 100° C., preferably from 95° C. to 100° C., for from about 1 min to about 10 mins exclusive of heating up time. Preferably, the rice is water cooked for from 1.5 mins to 4 mins and especially from 2 mins to 3 mins. Although water cooking at superatmospheric pressure, e.g., at temperatures above 100° C., would lead to a more rapid hydration, it has been found that such results in uneven gelatinization and causes dextrinization resulting in an uneven soft, mushy texture and poor rice color.

The pH during the water-cooking step is conveniently from 3 to 7.5. When microwave cooking is to be utilized to reconstitute the rice for consumption, the pH during water cooking is preferably from 3 to 5.5 because a better colored rice will be obtained upon reconstitution cooking. When a "standing" or "simmering" process, as is well-known in the art, is utilized to reconstitute, cook and prepare the precooked rice for consumption, the pH is preferably from 5 to 7 during water cooking.

Following water cooking, the partially hydrated rice grains then are steam pressure cooked at superatmospheric pressure in water, preferably and obviously most efficiently and practically, the water in which the rice was water cooked which has not been absorbed by the rice during water cooking is utilized for further hydrating the water cooked rice. During steam pressure cooking, it is essential to agitate the partially hydrated rice to provide uniform steam to rice contact and provide the desirable uniformity of product properties. Preferably, the agitation is gentle and is performed, again preferably, by tumbling the vessel end over end at a rate such as from about 3 to 6 RPM so the hydrated rice grains and water present gently tumble through the steam atmosphere providing intimate steam to rice contact and uniform heating while the rice continues to be hydrated to a moisture content of from about 60% to 75% by weight. Means such as stirring might be utilized, but the chance of damage to the rice grains is greater as compared with a tumbling action.

The steam pressure cooking is carried out preferably at pressures of between about 250 mm Hg and 2000 mm Hg above atmospheric pressure and more preferably at from about 300 mm Hg to 1500 mm Hg for a duration of from about 1.5 mins to about 30 mins. These pressures are necessary for ensuring the desired uniformity of product properties and for enabling efficient processing. Lower pressures are more appropriate for parboiled rice, and higher pressures and longer times are more suitable for brown and wild rice.

At the completion of the steam pressure cooking step, the vessel is gradually depressurized conveniently over a period of at least 15 secs, preferably from 0.5 min to 5 mins, and especially from 0.75 min to 1.25 mins. Doing so is important for obtaining the desired product texture because the greater the amount of puffing, the greater the chance for cellular disruption of the rice grains. That is, rapid depressurization will cause the rice to puff and expand to a degree which results in a rice product which has a less desirable texture and rehydration properties than does a rice product discharged from a pressurized vessel in which the pressure has been gradually reduced.

After depressurization, and before drying, preferably, any excess water is removed from the rice preferably by suction which, as the artisan will appreciate, provides for a more efficient drying operation. The rice also conveniently is rinsed to remove any surface starch, and this step may proceed simultaneously with removal of excess water. Each of these steps advantageously provides for reducing any stickiness the cooked rice might have and also advantageously enables a thicker layer of rice to be dried.

Although drying may be carried out in one step, most preferably, the drying is carried out in two steps, firstly, under stationary conditions and secondly, under agitated conditions, a procedure also disclosed and described in U.S. patent application Ser. No. 07/224,817, for obtaining an advantageous bulk density of from about 35 g/100 ml to 40 g/100 ml. Although temperatures of from about 140° C. to about 205° C. may be utilized for drying, the rice is preferably dried at a temperature from 145° C. to 180° C.

In a first drying step under stationary conditions, the cooked rice may be dried to a moisture content of from 10% to 35%, especially from 10% to 25%, and most preferably to from 10% to 15% by weight. This first drying step may be carried out in a conventional belt dryer or on a high air velocity belt dryer having means, such as nozzle tubes, to direct hot air at the rice.

When the cooked rice is dried in a conventional hot air belt dryer, it conveniently is fed onto the dryer in a layer. The thickness of the layer of rice grains on the belt may be from 2 mm to 10 mm and preferably from 3 mm to 6 mm. The velocity of the hot air may be from 10 m/min to 20 m/min. The duration of the first drying step in a conventional belt dryer to obtain the required moisture content is usually from about 10 mins to 20 mins and preferably from 12 mins to 18 mins depending on the drying temperature used and velocity of the hot air.

When the rice is dried in a high velocity hot air dryer, the cooked rice may be dried by passing the hot air through a layer of cooked rice. The thickness of the layer of cooked rice is conveniently from about 6 mm to 25 mm and preferably 12 mm to 16 mm thick, and the drying time may be from about 2 mins to 8 mins, preferably from 3 mins to 7 mins. The velocity of the hot air preferably ranges from about 100 m/min to about 200 m/min and especially from 135 m/min to about 165 m/min.

After the first drying step, the partially dried rice cake advantageously is broken for separating the rice grains.

In a second drying step, the partially dried rice grains are dried under agitated conditions to a stable moisture content of from about 6% to 12% by weight. The drying under agitated conditions may be carried out in a vibrating dryer such as a vibrating fluid bed dryer or by a high velocity belt dryer as in the first drying step. Preferably, the velocity of the hot air in the second drying step is not greater than that in the first drying step and may range from about 20 m/min to about 200 m/min and the drying time may be from about 15 secs to 120 secs, preferably from 45 secs to 60 secs.

Puffing can be equated with bulk density, and most advantageously, the dried rice has a bulk density on the order of from 35 g/100 cc to 40 g/100 cc, and most preferably on the order of from 36 g/100 cc to 38 g/100 cc. As can be gathered from the above disclosure, the bulk density of the product and the extent to which it is puffed is related not only to drying but also to the extent and quickness of pressure release after steam pressure cooking. When practicing the present invention, optimum bulk densities, and hence texture and rehydration properties, will be obtained when the pressure is released gradually and the two drying steps are performed as disclosed.

Another advantage of the present invention is that by drying at a temperature of from about 140° C. to 205° C., the rice need not be gelatinized completely during the water and steam cooking steps, thus reducing cooking losses. That is, the gelatinization may be completed in the drying step.

As noted, the rice product can, if desired, be prepared for consumption by microwave cooking. The time required for microwave cooking may range from about 2 mins to 20 mins depending upon the extent of puffing, variety of rice and the amount of rice and water used during microwave cooking. For example, the time required for microwave cooking milled, white rice treated by this invention is generally less than for treated parboiled rice. Wild and brown rice prepared in accordance with this invention may take longer to prepare.

In general, to prepare a quick-cooking parboiled rice produced by the process of the present invention in a microwave oven as utilized commonly in the home, it is possible to cook 100 g to 120 g of the rice with 230 cc water at high power in about 5 mins to 7 mins and to cook 200 g to 240 g of the rice with 460 cc water at high power in about 8 mins to 10 mins.

Other methods of preparing the rice products for consumption are "standing" and "simmering". In an example of a "standing" method, 100 g to 120 g of the rice are added to about 230 ml of boiled water, brought back to boil, removed from the heat, covered and allowed to stand, on average, for from about 8 mins to 10 mins. As examples of simmering:

a) Add 120 g of the treated parboiled rice into about 460 ml boiling water, reduce the heat and simmer for about 8 mins.

(b) Saute 120 g precooked, parboiled rice with 1 tablespoon butter or oil for 2 mins. Add 230 ml water, cover, reduce heat and simmer for about 8 mins. The rice will have a texture and appearance of fried rice.

If treated milled white rice is used, the simmering time is shorter and be on the order of from 5 mins to 7 mins, and for wild or brown rice, the preparation time will be longer.

EXAMPLES

The following Examples further illustrate the present invention.

EXAMPLE I 4.54 kg of raw parboiled rice (Riviana's PB-1) is cooked in 10 liters of water in a 100 liter steam processor which is equipped to tumble. The rice and water are heated at atmospheric pressure to boiling and then gently boiled for 2½ mins while the processor is in a stationary upright position. The vessel is closed off to the atmosphere, and the rice then is steamed at a pressure of 500 mm Hg above atmospheric pressure for 5½ mins while the vessel is tumbled end over end at 4 RPM to agitate the rice. The vessel then is stopped in the upright position and slowly depressurized by venting for one min to atmospheric pressure. The rice then is dumped from the vessel and rinsed. The rice is dewatered by suction for one min on a 8-mesh screen.

The moisture content of the cooked rice is 63% and the degree of gelatinization is 89%.

The cooked rice is dried for 7 mins at 150° C. by hot air at a velocity of 150 m/min to a moisture content of 22%. During this drying stage, the rice is in the form of a cake and becomes completely gelatinized (100%). The rice cake is broken and separated into individual grains and dried in a fluidized bed dryer for one min at 150° C. to a final moisture content of 8%.

The rice product is judged by a taste panel to be of excellent quality upon preparation by standing in boiled water for 10 mins.

EXAMPLE II

The process is the same as in Example I except that the steam cooking time is increased to 6½ mins. The moisture content of the water and steam cooked rice is 67% and the rice starch is fully gelatinized after steaming.

The rice quality is judged by a taste panel to be good but has a slightly softer texture than the rice of Example I.

EXAMPLE III

In this Example the process is the same as in Example I except the water-cooked, parboiled rice is steam pressure cooked at 1500 mm Hg above atmospheric pressure for 2 mins.

The rice quality is judged by the taste panel to be very good.

COMPARATIVE EXAMPLE

This Example describes the effect of water cooking at superatmospheric pressure. The basic process is the same as in Example III except that during the water cooking the vessel vent is closed and pressure is allowed to build in the processor consequently increasing the temperature to above 100° C.

Compared to the product of Example III, the rice product obtained has a texture which is uneven and some rice grains have hard centers indicating that gelatinization is not uniform.

EXAMPLES IV TO VII

A similar procedure to that in Example I is carried out except that, instead of using raw parboiled rice under the steaming conditions of 500 mm Hg for 5½ mins, the rice used and the steaming conditions are as indicated in the following Table.

| Example | Type of Rice | Steam Pressure (Above Atm.) | Time of Steaming |
|---|---|---|---|
| 4 | Milled, white | 300 mm HG | 7¾ min |
| 5 | Parboiled | 300 mm Hg | 8 min |
| 6 | Brown | 1500 mm Hg | 15 min |
| 7 | Wild | 1500 mm Hg | 20 min |

The rice quality in each case was judged by the taste panel to be very good.

From the foregoing, it will be clear to one of ordinary skill that various embodiments can be utilized to effect the objects of the present invention as described and illustrated without departing from the spirit and scope of the invention defined by the following claims.

We claim:

1. A process for preparing a quick cooking rice comprising:
   cooking rice under atmospheric pressure in an amount of water at least sufficient to hydrate the rice to a moisture content of from about 60% to 75% by weight and at a temperature of from about 90° C. to 100° C. for from about 1 min to 10 mins for hydrating the rice to a moisture content of from about 30% to 60% by weight;
   steam pressure cooking the water-cooked rice in water under a pressure of from about 250 mm Hg to 2500 mm Hg above atmospheric pressure for from about 1 min to 50 mins while agitating the rice and water for obtaining a cooked rice having a moisture content of from about 60% to 75% by weight and which is about 85% to 100% gelatinized;
   gradually releasing the pressure from the cooked rice for avoiding substantially puffing the cooked rice; and
   drying the cooked rice at a temperature of from about 140° C. to 205° C. to a stable moisture content.

2. A process according to claim 1 wherein the drying is carried out in two steps, the first being under stationary conditions and the second being under agitated conditions.

3. A process according to claim 1 or 2 wherein the water for water cooking the rice is in an amount of a ratio of water to rice of about 1.5:1 to 5:1 by weight and the water remaining after water cooking is steam pressure cooked with the water-cooked rice for further hydrating the water-cooked rice.

4. A process according to claim 1 or 2 wherein the rice is hydrated to a moisture content of from about 40% to 45% by weight during water cooking.

5. A process according to claim 1 or 2 wherein the raw rice is water cooked for from about 1.5 min to 4 mins and the water-cooked rice is steam pressure cooked under a pressure of from about 250 mm Hg to 2000 mm Hg above atmospheric pressure for from about 1.5 min to 30 mins.

6. A process according to claim 5 wherein the water-cooked rice is steam pressure cooked under a pressure of from about 300 mm Hg to 1500 mm Hg above atmospheric pressure.

7. A process according to claim 1 or 2 wherein the agitation during the steam cooking step is carried out by tumbling the rice and water.

8. A process according to claim 2 further comprising breaking the partially dried rice for separating rice grains after the first drying step and then drying the separated rice grains in the second drying step.

9. A process according to claim 1 or 2 wherein the cooked rice is dried at a temperature of from about 145° C. to 180° C.

10. A process according to claim 2 wherein the cooked rice is first dried under the stationary conditions to a moisture content of from about 10% to 15% by weight.

11. A process according to claim 1 or 2 wherein the pH during water cooking is from 3 to 5.5.

12. A process according to claim 1 wherein the rice to be prepared into the quick cooking rice is selected from a group consisting of raw rice, milled white rice, brown rice, wild rice, arborio rice, basmati rice, spanish rice and parboiled rice.

13. A process according to claim 3 wherein the agitation during the steam cooking step is carried out by tumbling the rice and water.

14. A process for preparing a quick cooking rice comprising:
   cooking rice in water under atmospheric pressure at a temperature of from about 90° C. to 100° C. for hydrating the rice to a moisture content of at least 30% by weight;
   steam pressure cooking the water-cooked rice in water under a pressure of from about 250 mm Hg to 2500 mm Hg above atmospheric pressure while agitating the rice and water for obtaining a cooked rice having a moisture content of from about 60% to 75% by weight and which is about 85% to 100% gelatinized;
   gradually releasing the pressure from the cooked rice for avoiding substantially puffing the cooked rice; and
   drying the cooked rice at a temperature of from about 140° C. to 205° C. to a stable moisture content.

* * * * *

UNITED STATES PATENT AND TRADEMARK OFFICE
CERTIFICATE OF CORRECTION

PATENT NO. : 5,089,281

DATED : February 18, 1992

INVENTOR(S) : Afif A. Baz, et al.

It is certified that error appears in the above-identified patent and that said Letters Patent is hereby corrected as shown below:

Column 1, line 59, after "chamber", insert --such--.

Column 1, line 59, after "about", delete "between".

Column 8, line 8, delete "raw".

Column 1, line 7, after "1989" and before the period, insert a comma and then insert --now abandoned--.

Signed and Sealed this

Fourth Day of May, 1993

*Attest:*

MICHAEL K. KIRK

*Attesting Officer*      *Acting Commissioner of Patents and Trademarks*